United States Patent
Niemann et al.

(10) Patent No.: US 10,866,871 B1
(45) Date of Patent: Dec. 15, 2020

(54) PROCESSES AND METHODS OF AGGREGATING, ANALYZING, AND REPORTING DISTRIBUTED STORAGE SYSTEM PROPERTIES WITHIN A CENTRAL PLATFORM USING STORAGE DESCRIPTOR DATA STRUCTURES

(71) Applicant: Hitachi, Ltd., Tokyo (JP)

(72) Inventors: Darrell L. Niemann, Santa Clara, CA (US); Bryan Ribaya, Bakersfield, CA (US); Jovi Gacusan, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/551,247

(22) Filed: Aug. 26, 2019

(51) Int. Cl.
*G06F 11/30* (2006.01)
*G06F 3/06* (2006.01)

(52) U.S. Cl.
CPC .......... *G06F 11/3006* (2013.01); *G06F 3/065* (2013.01); *G06F 3/067* (2013.01); *G06F 3/0608* (2013.01); *G06F 3/0614* (2013.01); *G06F 3/0647* (2013.01)

(58) Field of Classification Search
CPC .................................................. G06F 11/3006
USPC .......................................................... 711/154
See application file for complete search history.

(56) References Cited

U.S. PATENT DOCUMENTS

| | | | |
|---|---|---|---|
| 7,509,589 B2 * | 3/2009 | Hallisey | G06F 3/0482 715/853 |
| 9,886,301 B2 | 2/2018 | Hudzia et al. | |
| 2014/0114933 A1 * | 4/2014 | Chandrasekarasastry | G06F 3/06 707/692 |

* cited by examiner

*Primary Examiner* — Jae U Yu
(74) *Attorney, Agent, or Firm* — Procopio, Cory, Hargreaves & Savitch LLP

(57) ABSTRACT

Example implementations described herein are directed to a storage descriptor data structure that can represent characteristics of the dataset stored in an underlying volume without requiring the dataset in the volume to be migrated for processing. Such data structures are more compressed than the original data structure and can therefore facilitate storage allocation before the migration is conducted.

15 Claims, 10 Drawing Sheets

PROCESSES AND METHODS OF AGGREGATING, ANALYZING, AND REPORTING DISTRIBUTED STORAGE SYSTEM PROPERTIES WITHIN A CENTRAL PLATFORM USING STORAGE DESCRIPTOR DATA STRUCTURES

BACKGROUND

Field

Example implementations are generally directed to storage systems, and more specifically, to storage descriptor structures to create a virtual representation of the storage system.

Related Art

In a related art implementation, there are distributed nodes that calculate HyperLogLog bitmaps of memory of virtual machines (VMs) and the node and send the bitmaps to a centralized coordinator. Then, the coordinator examines the overlap between memories based on the bitmaps and conducts data migration to maximize deduplication gain.

Such related art implementations utilize multiple workloads accessing respective sets of memory pages to decide where to migrate the selected workload.

The physical process of storing data is done in a distributed fashion. To gain insight of the overall dataset, one would first need to aggregate all of the distributed data prior to analysis. However, such related art implementations are inefficient, resource-intensive, time consuming, and for large datasets, impossible. Thus, there is a need to represent and describe storage systems in a manner such that the storage systems can be incorporated in a faster and more lightweight analysis.

SUMMARY

As the need to store data continues to grow, so does the architectural and management complexity of the storage systems in which the data reside. Efficiently sizing for storage system specifications requires insights into various types of information, including the underlying dataset. With various technologies, vendors, platforms, and applications involved in a data system, the overall dataset becomes fragmented as it is distributed across the storage system. The distributed nature provides challenges in extracting valuable properties of the entire dataset. To address this challenge, processes and methods of aggregating, analyzing, and reporting the distributed storage system properties are proposed herein. Primarily, the example implementations described herein involve Storage Descriptor Data Structures (SDDS), which are used in such a way to create a virtual representation of a storage system.

The SDDS is composed of a plurality of various types of information concerning the storage data. Generally speaking, it is composed of metadata and storage descriptors. The metadata can involve information describing the set of storage descriptors. Such metadata can include, for example, information about the storage system on which the storage data reside, such as the internet protocol (IP) address and its physical location. The storage descriptors represent the characteristics of a dataset. In one example, a storage descriptor could be the compression ratio obtained from sampling a data volume. In another example, it could be an entire probabilistic data structure obtained by applying an algorithm, such as the HyperLogLog, on an entire distributed dataset. This data structure can be used to estimate the cardinality of a dataset, and then derive the deduplication ratio. The idea then is to aggregate the various information, metadata and storage descriptors, into a new data structure which can be used to create a virtual representation of a storage system for various types of analysis, such as system sizing.

Aspects of the present disclosure can involve a method, involving determining volume identification information and a probabilistic data structure indicative of size of duplicate data in a volume from sampling data stored in the volume; generating storage descriptor data describing the volume from the volume identification information and the probabilistic data structure; storing the storage descriptor data in a centralized management system; and generating a user interface configured to indicate a state of data reduction of the volume.

Aspects of the present disclosure can involve a system, involving means for determining volume identification information and a probabilistic data structure indicative of size of duplicate data in a volume from sampling data stored in the volume; means for generating storage descriptor data describing the volume from the volume identification information and the probabilistic data structure; means for storing the storage descriptor data in a centralized management system; and means for generating a user interface configured to indicate a state of data reduction of the volume.

Aspects of the present disclosure can involve a non-transitory computer readable medium, storing instructions for executing a process, the instructions involving determining volume identification information and a probabilistic data structure indicative of size of duplicate data in a volume from sampling data stored in the volume; generating storage descriptor data describing the volume from the volume identification information and the probabilistic data structure; storing the storage descriptor data in a centralized management system; and generating a user interface configured to indicate a state of data reduction of the volume.

Aspects of the present disclosure involve a storage system configured to manage a plurality of volumes, the storage system involving a processor, configured to determine volume identification information and a probabilistic data structure indicative of size of duplicate data in a volume from the plurality of volumes from sampling data stored in the volume; generate storage descriptor data describing the volume from the volume identification information and the probabilistic data structure; store the storage descriptor data in a centralized management system; and generate a user interface configured to indicate a state of data reduction of the volume.

DETAILED DESCRIPTION

Figure 1:
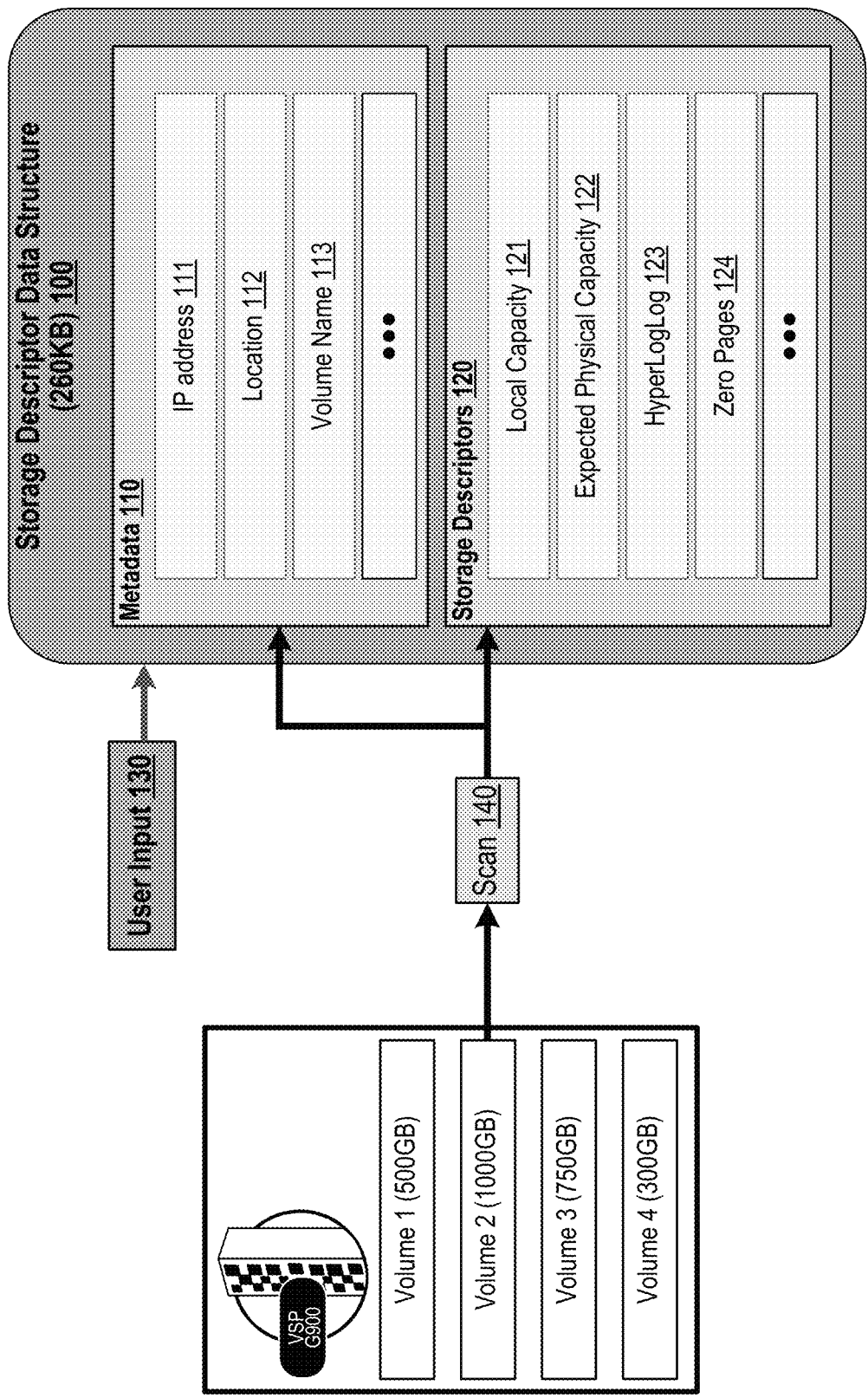
FIG. 1 illustrates an example of SDDS management, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

In related art implementations, there is a problem in that there is no method to determine the characteristics of the dataset stored in a particular storage volume without moving the dataset to the system conducting the analysis. Example implementations described herein are directed to providing a compressed data structure to provide the characteristics of a dataset of a particular storage volume in a manner that is far more compressed than the underlying dataset itself. Such compressed structures can facilitate the determination by other storage systems regarding the array sizing. Example implementations are directed to compressed and efficient data structures to provide characteristics of underlying data stored in the managed storage arrays of a system. In particular, example implementations utilize probabilistic data structures to get a better representation of the data that is on the arrays. The compressed data structures can provide an estimate regarding the cardinality of a particular dataset.

Unlike the related art implementations, the example implementations described herein are not limited to workloads, which imply requests or action from the host(s); instead, the example implementations are targeted at data. Further, example implementations described herein are not limited to memory pages on compute nodes, as the descriptors in example implementations describe data on storage devices, not just in memory on compute nodes. Additionally, the example implementations described herein are aimed at description, or representation, of the characteristics of a dataset and not necessarily migration of that data. Related art implementations also focus on bitmaps and properties thereof. However, such related art properties are relevant to probabilistic data structures.

In example implementations described herein, there is a process for creating a storage descriptor data structure, and the SDDS itself. The process of creating a SDDS involves generating metadata and storage descriptors. This process includes gathering storage system information and user input to create metadata, and scanning a dataset to generate storage descriptors. The process also includes the procedure for finding the union of two or more SDDS to form an aggregate SDDS.

The SDDS is a data structure, composed of metadata and storage descriptors, which is a representation of a dataset. The objects that make up the metadata can be of different types. Similarly, the various storage descriptors can be of different object types. For example, one descriptor can be a simple integer value that represents the logical capacity of a dataset, while another descriptor can be a complex data structure such as HyperLogLog. The SDDS has a much smaller data footprint in comparison to the dataset it represents.

Due to the reduced amount of storage for the SDDS in comparison to the dataset, the SDDS can be very portable. A high volume of SDDS can be stored in a centralized data pool for analysis and reporting. The process of updating the descriptor sets inside the centralized location can be continuous or asynchronous. Analysis can include the aggregation, or union, of two or more SDDS to form a single SDDS which represents the characteristics of the combined dataset. An SDDS can then be used for various storage-related applications, such as for reporting and for storage product sizing.

FIG. 1 illustrates an example of SDDS management, in accordance with an example implementation. A dataset can be managed in a virtual or a physical data storage volume which resides locally in a system or in a remote system. The dataset can involve various characteristics including, but not limited to, compressibility, dedupability, and a zero reduction ratio.

As illustrated in FIG. 1, although the data capacity itself can be large, the characteristics or descriptors of interest do not require much storage capacity. In example implementations as described herein, the SDDS 100 includes metadata 110 and storage descriptors 120 regarding the dataset, which can provide compressed characteristics of the underlying dataset even for large gigabyte or terabyte storage volumes. The compression ratio characteristic, for example, only requires the storage descriptors 120, which can involve logical capacity 121 and the expected physical capacity 122 after compression. The logical capacity 121 is the space, from the host-view perspective, that the data occupies. The expected physical capacity 122 is the actual space that they are expected to occupy on the storage drives after being compressed. The zero pages 124 indicate how many pages and/or which pages within the volume are all zeros.

Other data descriptors can involve probabilistic data structures. In order to determine the deduplication ratio for multiple data volumes, the HyperLogLog 123 of each volume is utilized. Yet despite the added complexity, the size of a HyperLogLog 123 is miniscule in size compared to the dataset itself. The User input 130 and system information, which form the metadata 110, also occupy relatively little capacity. Therefore, with the SDDS 100, a sufficient description of a dataset for conducting operations can be provided without having to download the dataset itself.

Metadata 110 and storage descriptors 120 can be provided based on a scan 140 of the underlying storage volume, and modifiable by user input 130 in accordance with the desired implementation. In the example of FIG. 1, the scan 140 is conducted on storage volume 2 (1000 GB).

Depending on the desired implementation, user input 130 can also be information that is provided by the underlying storage system holding the volume. Further, in example implementations, a hyperloglog process can be executed on the dataset by the scan 140 to facilitate the extraction of such information. The hyperloglog itself is a probabilistic data structure that indicates what data is stored in the dataset without requiring the dataset itself, and the hyperloglog process conducts a sampling of such datasets to determine the information as indicated in storage descriptors 120, and depending on the desired implementation, metadata 110 as well.

Figure 2:
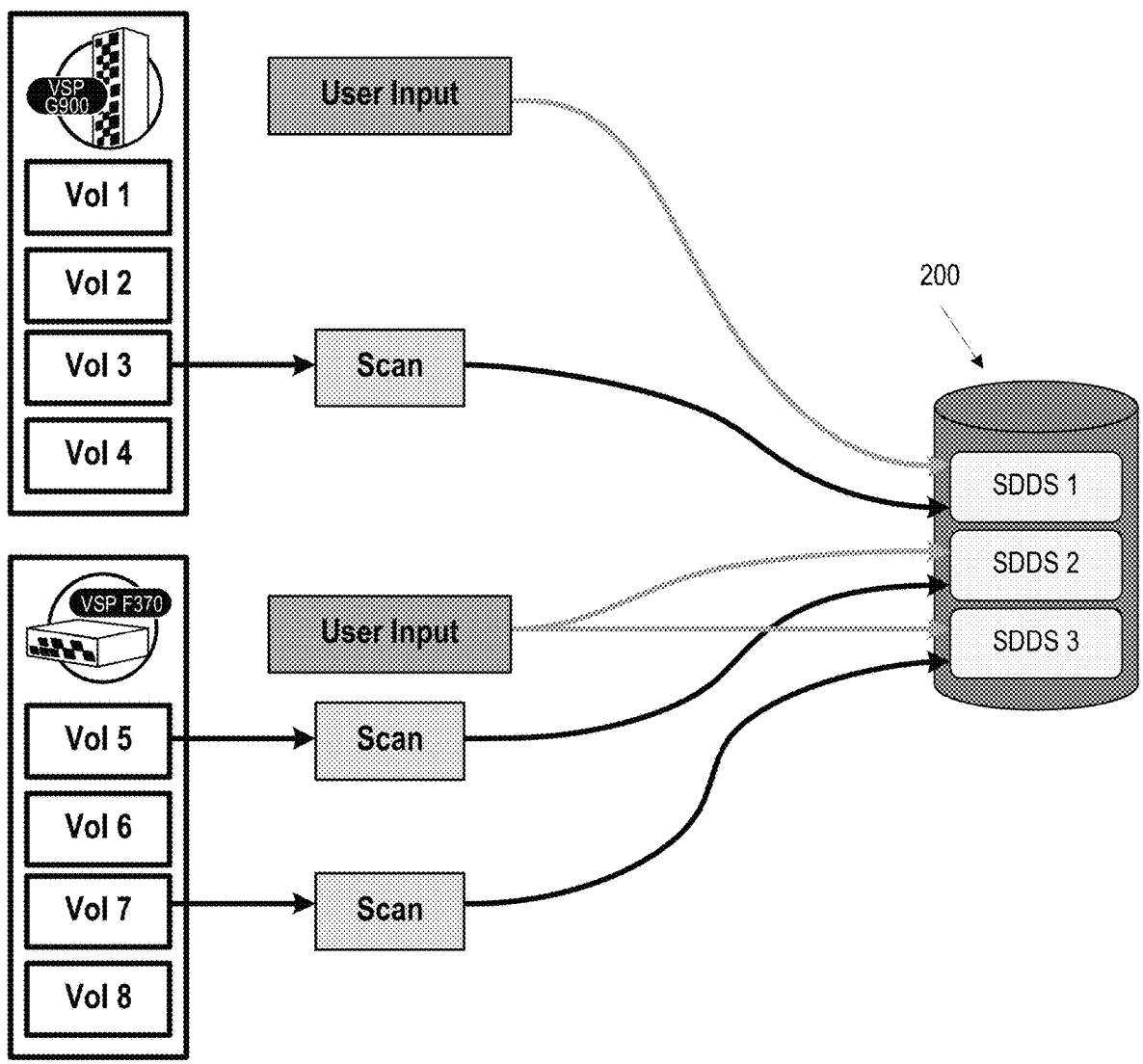
FIG. 2 illustrates an example of SDDS on a centralized platform, in accordance with an example implementation.

FIG. 2 illustrates an example of SDDS on a centralized platform, in accordance with an example implementation. The SDDS for many datasets can be stored in a centralized platform 200, as shown in FIG. 2. Multiple volumes can all exist in an on-premise system or even within remote systems. So, rather than having to migrate entire data volumes to another system for analysis, example implementations can utilize scanning of each dataset as well as to aggregate storage descriptors.

The descriptors, along with other user-generated information, are then combined into a data structure within the central platform 200. A SDDS for each volume can be readily retrieved for a quick analysis of the associated volume. Individual characteristics, such as compressibility, can be evaluated to determine how much capacity the volume would occupy if a compression algorithm were executed on the volume. Further, example implementations can facilitate the viewing of other descriptors from the data structure, such as dedupability, and combine it with the compressibility of the volume to provide an overall picture of how the data would occupy storage if a deduplication algorithm is run against it to remove duplicate data. If the Storage Descriptor Data Structure also contains the zero reduction ratio, then users can evaluate what happens when additional reduction techniques are applied. Thus, the example implementations not only involve the SDDS, but also the process of combining these effects, described and collected in the Storage Descriptor Data Structure, to get an overall picture of the dataset.

Figure 3:
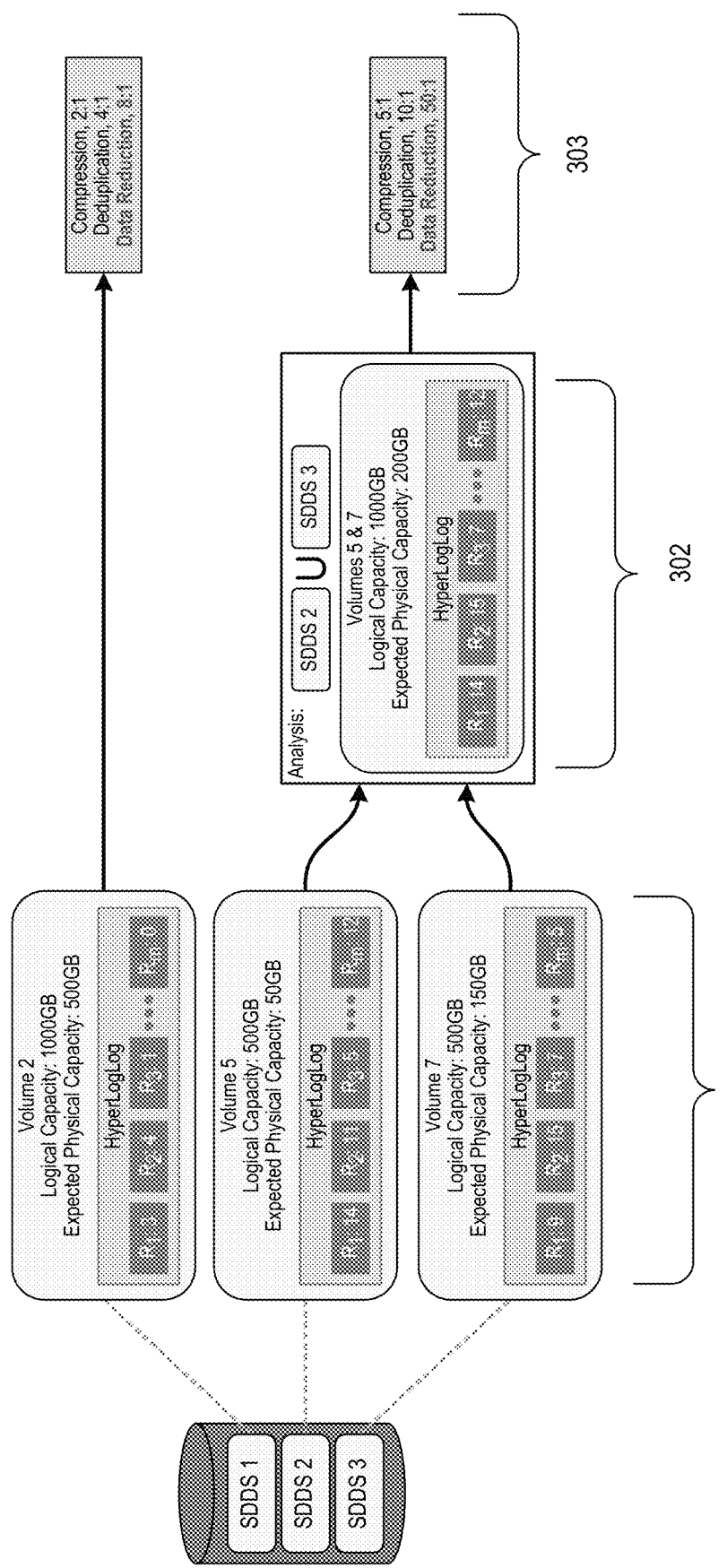
FIG. 3 illustrates an example of a combination of SDDS to produce volume characteristics, in accordance with an example implementation.

FIG. 3 illustrates an example of a combination of SDDS to produce volume characteristics, in accordance with an example implementation. Each SDDS is associated with a particular volume as illustrated at 301. At 302, one SDDS can be merged with another to describe the union of two or more datasets. Volume characteristics 303 of the dataset illustrate characteristics of various operations for the one or combination of volumes associated with the SDDS or merged SDDS.

As illustrated in FIG. 3, if multiple volumes are being merged for migration, then the underlying SDDS of the volumes can also be merged to provide an indication regarding the characteristics of the merged volumes. For example, if the compressibility of the merged volume needs to be determined, then the compressibility information from the SDDS of the underlying volumes to be merged can be aggregated. Other information, such as hyperloglog or other probabilistic data structures can similarly be adjusted and aggregated in accordance with the desired implementation. Further, as the SDDS are much more compressed data structures than the underlying datasets stored in the volumes, SDDS can be migrated and managed more easily than migrating and managing the volumes themselves.

Figure 4:
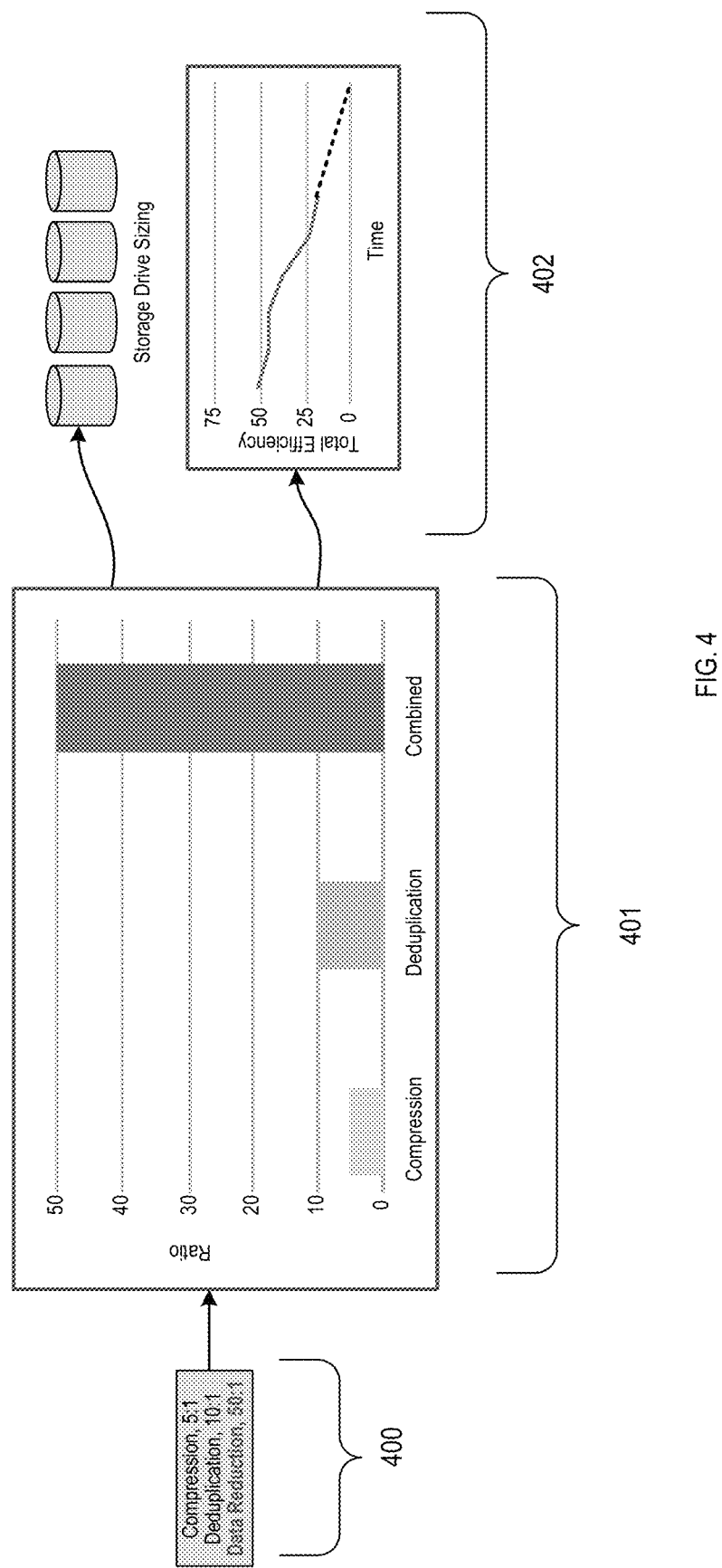
FIG. 4 illustrates an example sample report that can be generated from the SDDS, in accordance with an example implementation.

FIG. 4 illustrates an example sample report that can be generated from the SDDS, in accordance with an example implementation. The Storage Descriptor Data Structure, for one volume or from the union of multiple volumes, can be employed to generate a report of the dataset. In particular, FIG. 4 illustrates a sample report 400, which shows the compressibility, dedupability, and overall total data reduction efficiency. These reports can possibly exist in a dashboard, where a customer can see near-real-time statistics on the current state of one or more storage systems as illustrated at 401 and 402. For example, a sales representative can also use the statistics in the reports to perform storage sizing exercises for a new system, including determining the necessary number of drives needed as illustrated at 402 of FIG. 4. Further, example implementations can provide interfaces to track the evolution of the SDDS over time, in order to project the future characteristics of the volume(s). In the example of 402 of FIG. 4, it is apparent that the usage of the system has changed because data reduction has become less effective. This information can be built into an automated reporting system that can warn a customer and even recommend upgrades in accordance with the desired implementation.

Figure 5:
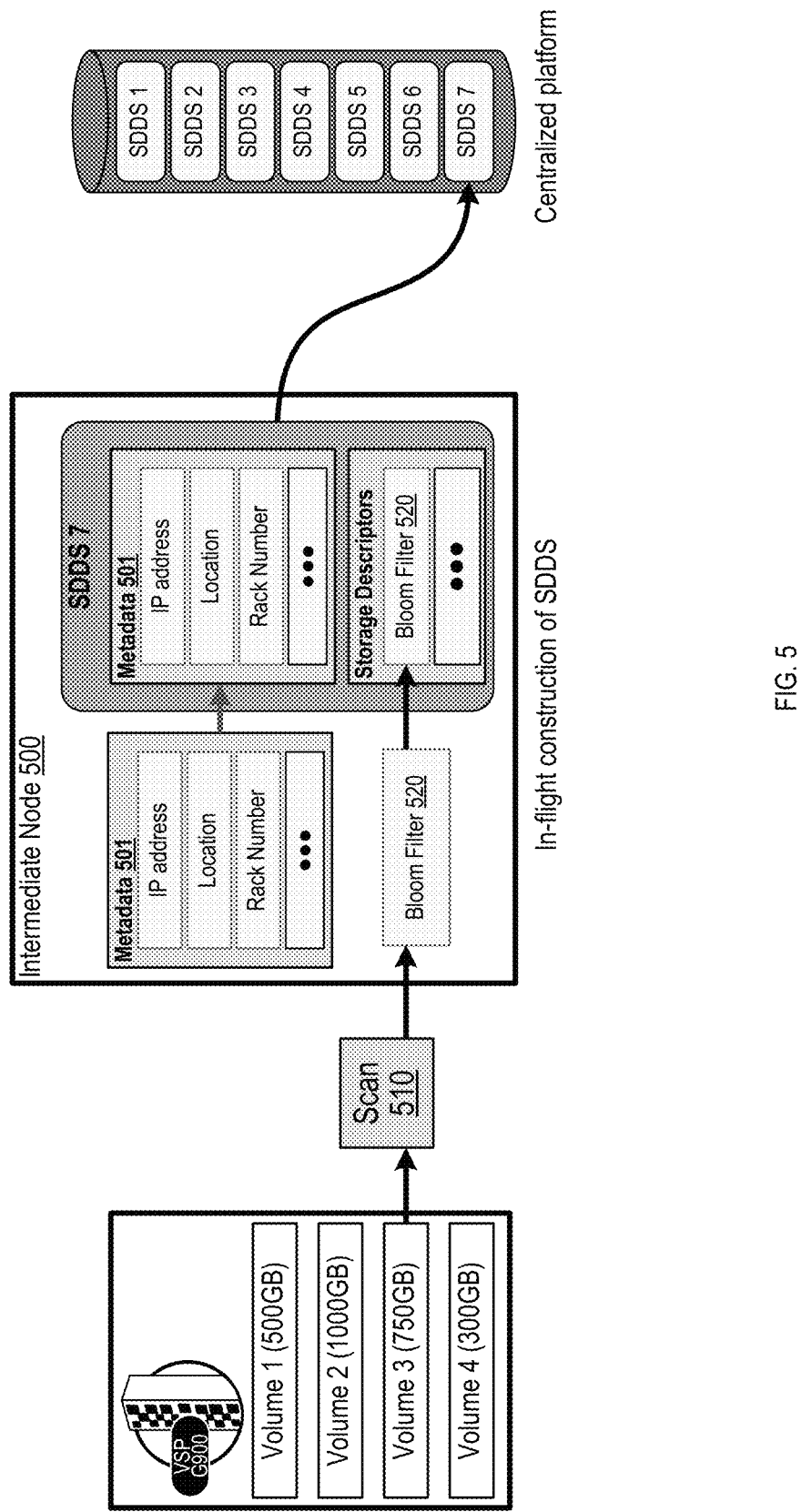
FIG. 5 illustrates an example of construction of an SDDS in-flight in accordance with an example implementation.

FIG. 5 illustrates an example of construction of an SDDS in-flight in accordance with an example implementation. As shown in FIG. 5, an SDDS can be constructed in-flight with further addition of metadata 501 at intermediary nodes 500. In FIG. 5, an intermediate node 500 contains the metadata 501 for a storage subsystem. The node scans 510 the subsystem to determine the bloom filter 520 (a probabilistic data structure) of Volume 3. The metadata 501 and bloom filter 520 are then used to construct SDDS 7. The new SDDS is then sent to the centralized platform for storage among other SDDS.

The example implementations of combining storage descriptors as well as metadata to form SDDS used in creating an overall representation of a storage system is a powerful and new technique. The descriptor set can be stored in a lightweight storage descriptor data structure. Thus, many such data structures can be stored in a central location for quick retrieval and analysis. This solves a current problem where generating a description of the dataset or datasets could only be achieved by using the dataset itself. This is an inefficient process, as datasets can be large and distributed locally or even remotely, making analysis slow and resource-intensive. The descriptor data structure is small, in comparison to the data that it represents. The SDDS is therefore portable, and one or more of these descriptor data structures can be migrated to and from a small, central pool of data structures. Each of these structures provides a comprehensive description of its respective dataset. Moreover, two or more of them can be merged to create a unified SDDS, which represents the aggregation of multiple datasets. This novel process and data structure has far-reaching applications, particularly for our own company and for the storage industry at large.

In the example of FIG. 5, a bloom filter 520 is utilized as another example of a probabilistic data structure, which can be utilized in conjunction or in lieu of the hyperloglog process to determine a representation of the dataset for the SDDS. A bloom filter process can involve hashing algorithms that compute the cardinality of the dataset, to provide the probability of duplicate data stored in the dataset. Other probabilistic data structures can also be utilized so long as such structure involves a process to determine whether duplicate data exists in the dataset.

As the SDDS data structure is flexible and consumes less storage space than the underlying dataset, there is a multitude of uses for them that are improvements to related art techniques. Various example implementations are described as follows.

Figure 6:
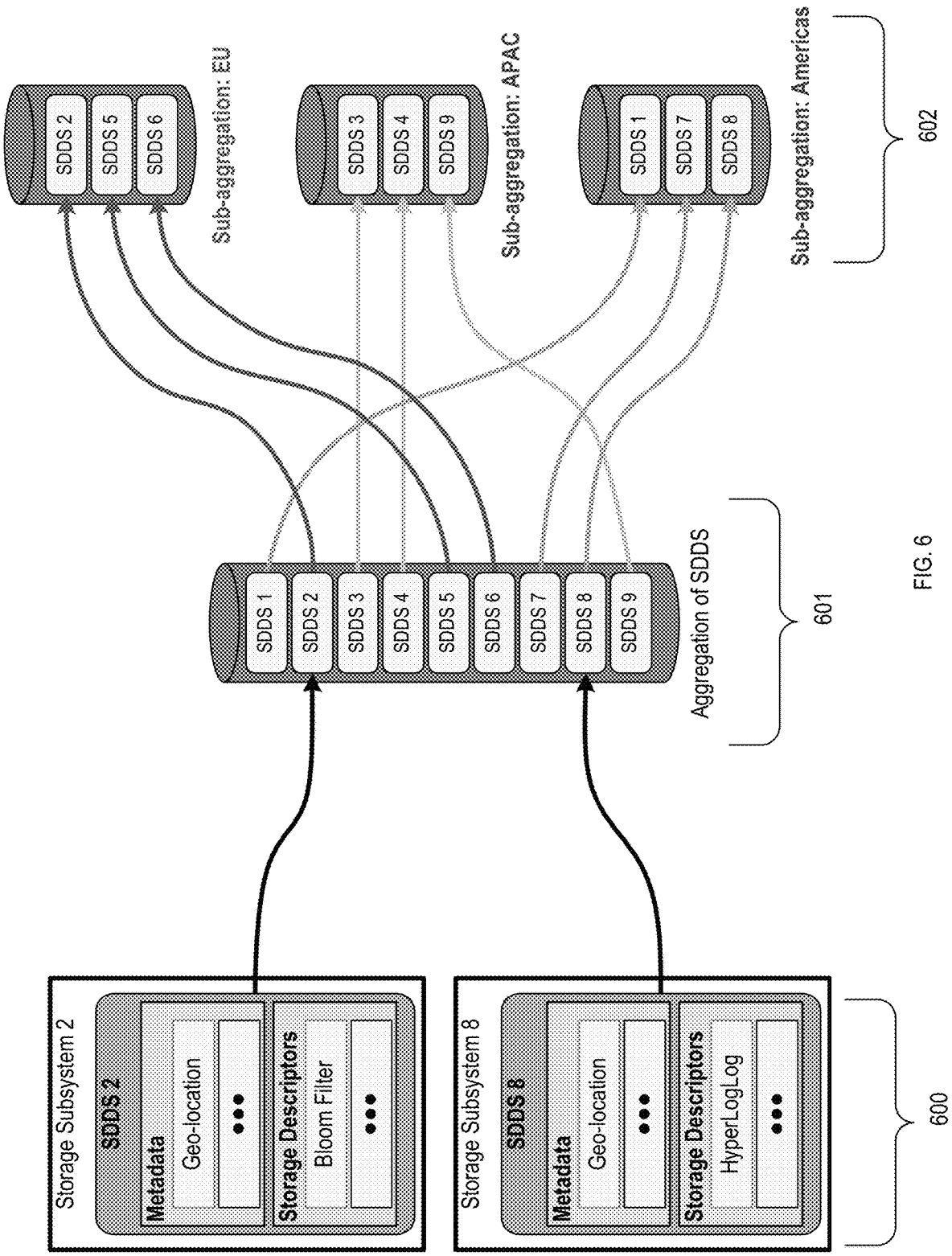
FIG. 6 illustrates examples of sub-aggregations from SDDS aggregation, in accordance with an example implementation.

In an example implementation, there is the forming of sub-aggregations from SDDS aggregation. FIG. 6 illustrates examples of sub-aggregations 602 from SDDS aggregation, in accordance with an example implementation. From an aggregation of storage descriptor data structures, one can form other collections of SDDS in accordance with the desired implementation. In the example shown in FIG. 6, storage subsystems 600 each form an SDDS which includes geo-location in its metadata. The SDDS from these nodes are aggregated in a central platform at 601. Based on the geo-location information, each SDDS is also copied and saved in separate, sub-aggregations for the European Union, for Asia Pacific, and for the Americas at 602.

Figure 7:
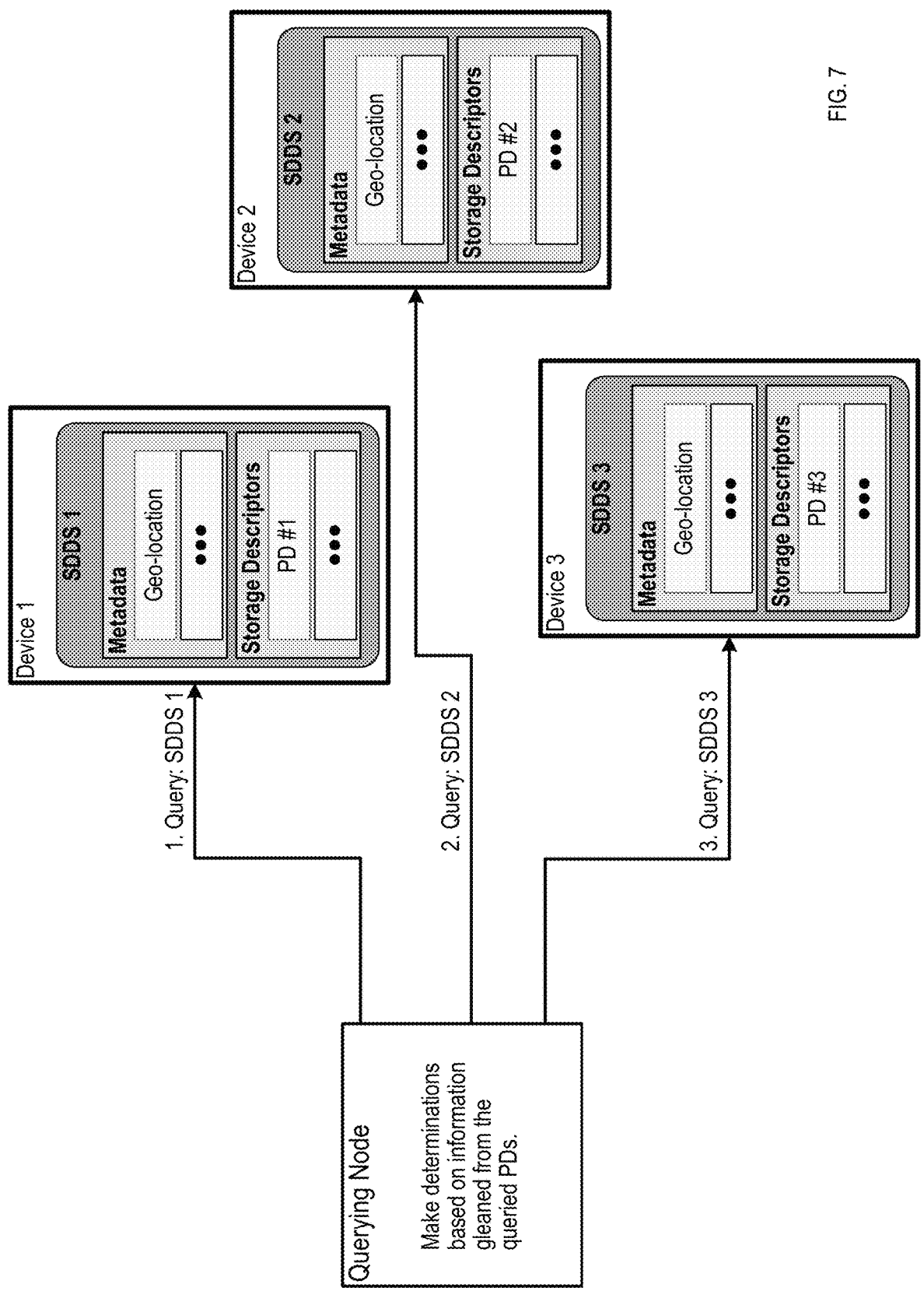
FIG. 7 illustrates an example of storing and updating SDDS in place on specific device nodes, in accordance with an example implementation.

In an example implementation, SDDS can be integrated into specific device nodes due to requiring little storage capacity. FIG. 7 illustrates an example of storing SDDS in specific device nodes, in accordance with an example implementation. In the example of FIG. 7, a SDDS is stored in each of several device nodes and may contain information regarding numerous individual data points. Each node individually tracks and updates its own SDDS. The querying node can thereby transmit a query to each of the device nodes to check information stored in the probabilistic data structure (PD) in its SDDS and report back on its determination.

Figure 8:
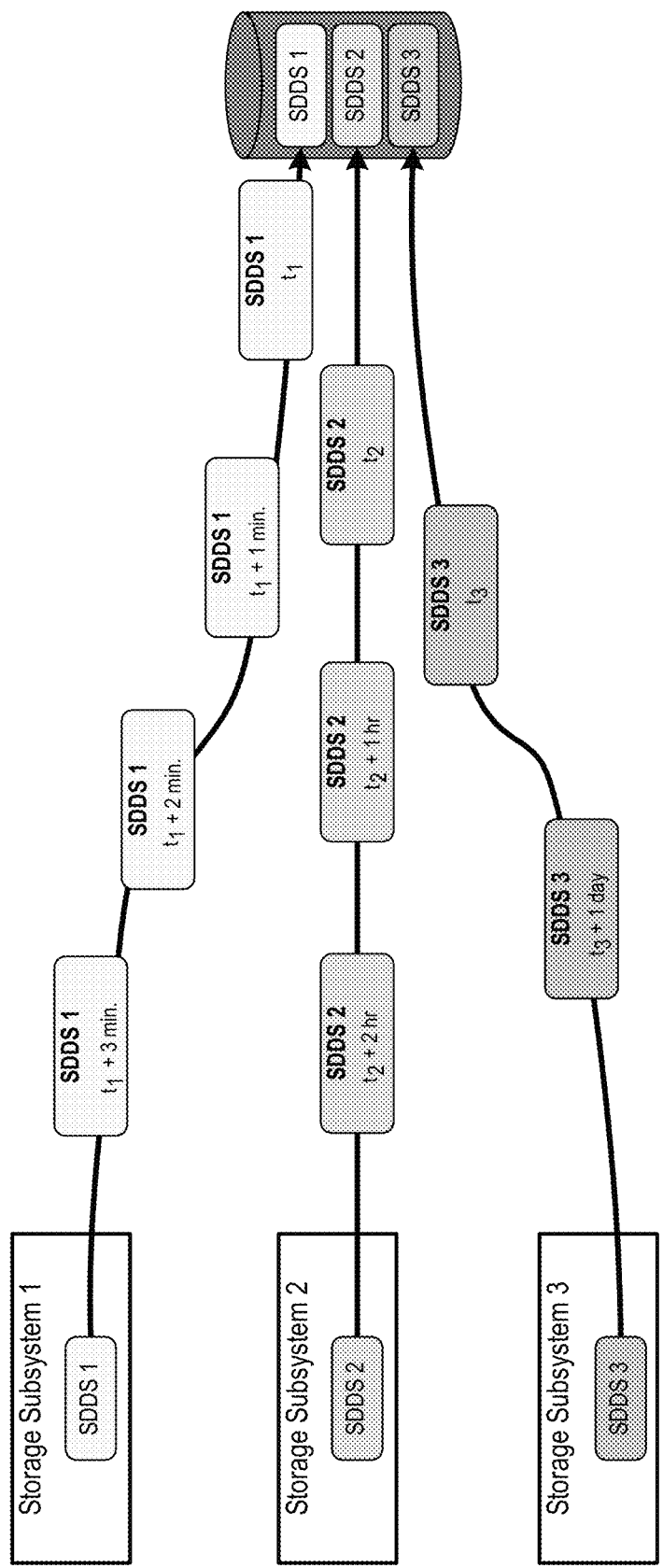
FIG. 8 illustrates an example of a streaming SDDS system, in accordance with an example implementation.

FIG. 8 illustrates an example of a streaming SDDS system, in accordance with an example implementation. In an example system involving streaming, SDDS from various storage subsystems can be scheduled to automatically stream to the central platform. In the case shown in FIG. 8, three different SDDS are updated once every minute, once every hour, and once every day, however such example implementations can be adjusted to fit the desired implementation.

In such an example implementation, the storage systems can be configured to execute the hyperloglog or bloom filter process to compute the data for the storage descriptors, and generate the SDDS and provide it to the centralized platform. Such a process can be automated such that the storage systems execute the generation of the SDDS periodically.

Figure 9:
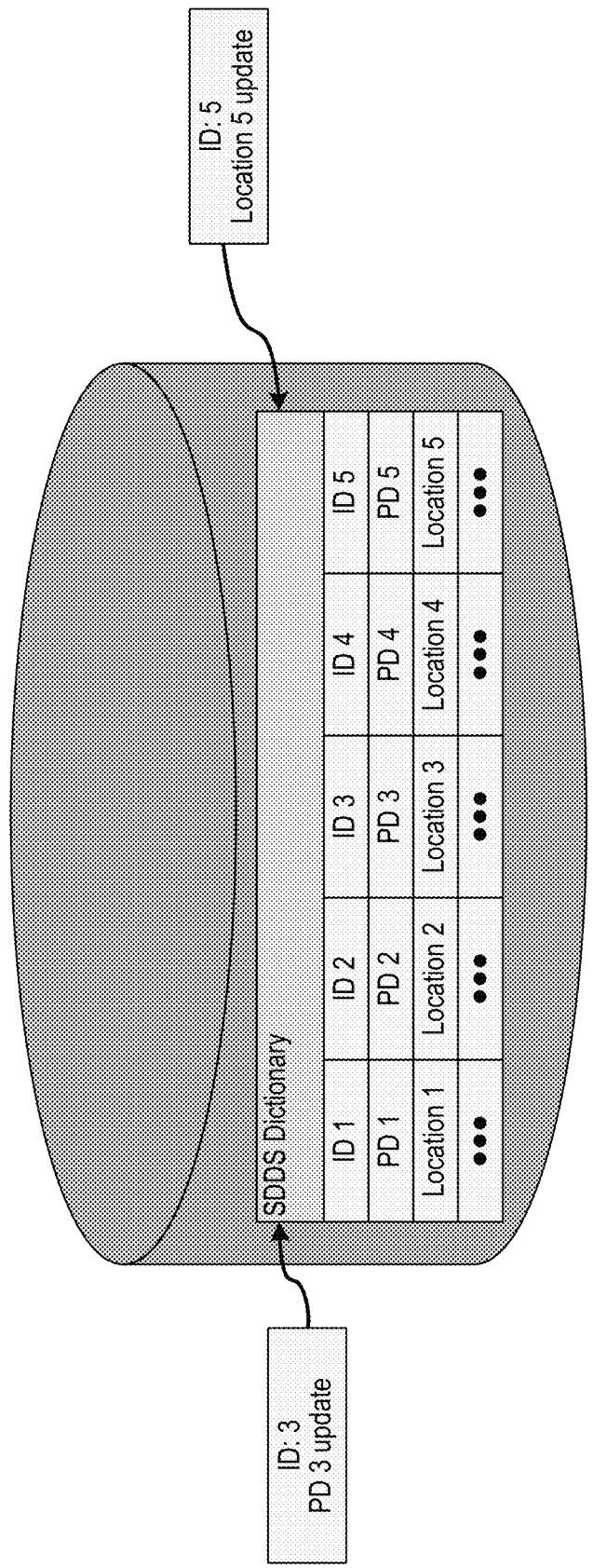
FIG. 9 illustrates an example of storing SDDS, in accordance with an example implementation.

FIG. 9 illustrates an example of storing SDDS, in accordance with an example implementation. In an example system involving storing SDDS, the storage descriptor data structure is an object. As such, it can be stored in object storage data structures. In the example in FIG. 9, many SDDS are stored in and can be referenced from a dictionary object. Depending on the desired implementation, an interface can be provided to update object attributes, such as a probabilistic data structure (PD) or metadata, by referencing an SDDS ID and updating the dictionary.

Figure 10:
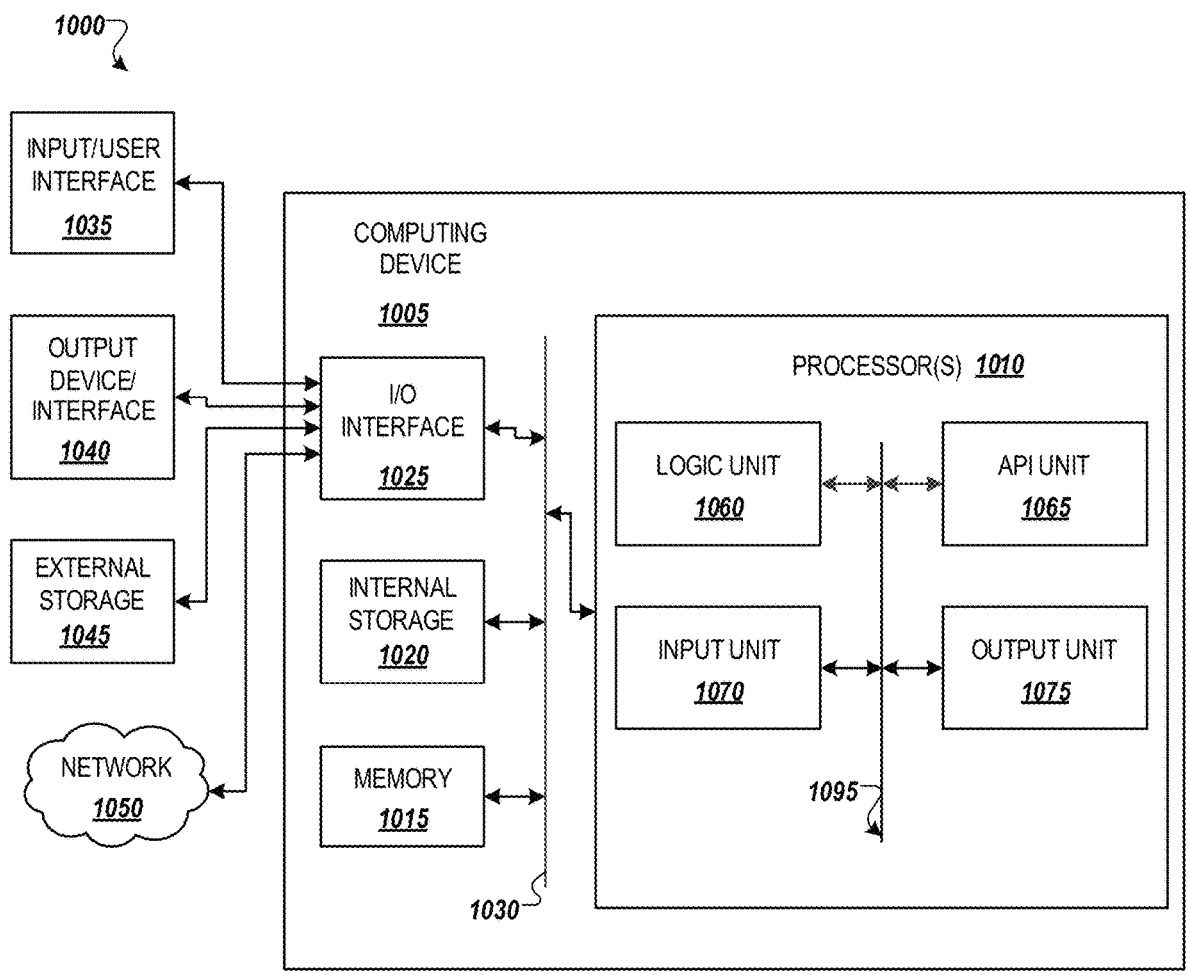
FIG. 10 illustrates an example computing environment with an example computer device suitable for use in some example implementations.

FIG. 10 illustrates an example computing environment with an example computer device suitable for use in some example implementations, such as a storage system managing one or more volumes that needs to generate SDDS or facilitate a volume migration. Computer device 1005 in computing environment 1000 can include one or more processing units, cores, or processors 1010, memory 1015 (e.g., RAM, ROM, and/or the like), internal storage 1020 (e.g., magnetic, optical, solid state storage, and/or organic), and/or I/O interface 1025, any of which can be coupled on a communication mechanism or bus 1030 for communicating information or embedded in the computer device 1005. I/O interface 1025 is also configured to receive images from cameras or provide images to projectors or displays, depending on the desired implementation.

Computer device 1005 can be communicatively coupled to input/user interface 1035 and output device/interface 1040. Either one or both of input/user interface 1035 and output device/interface 1040 can be a wired or wireless interface and can be detachable. Input/user interface 1035 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1040 may include a display, television, monitor, printer, speaker, braille, or the like. In some example implementations, input/user interface 1035 and output device/interface 1040 can be embedded with or physically coupled to the computer device 1005. In other example implementations, other computer devices may function as or provide the functions of input/user interface 1035 and output device/interface 1040 for a computer device 1005.

Examples of computer device 1005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1005 can be communicatively coupled (e.g., via I/O interface 1025) to external storage 1045 and network 1050 for communicating with any number of networked components, devices, and systems, including one or more computer devices of the same or different configuration. Computer device 1005 or any connected computer device can be functioning as, providing services of, or referred to as a server, client, thin server, general machine, special-purpose machine, or another label.

I/O interface 1025 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1000. Network 1050 can be any network or combination of networks (e.g., the Internet, local area network, wide area network, a telephonic network, a cellular network, satellite network, and the like).

Computer device 1005 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1010 can execute under any operating system (OS) (not shown), in a native or virtual environment. One or more applications can be deployed that include logic unit 1060, application programming interface (API) unit 1065, input unit 1070, output unit 1075, and inter-unit communication mechanism 1095 for the different units to communicate with each other, with the OS, and with other applications (not shown). The described units and elements can be varied in design, function, configuration, or implementation and are not limited to the descriptions provided. Processor(s) 1010 can be in the form of hardware processors such as central processing units (CPUs) or in a combination of hardware and software units.

In some example implementations, when information or an execution instruction is received by API unit 1065, it may be communicated to one or more other units (e.g., logic unit 1060, input unit 1070, output unit 1075). In some instances, logic unit 1060 may be configured to control the information flow among the units and direct the services provided by API unit 1065, input unit 1070, output unit 1075, in some example implementations described above. For example, the flow of one or more processes or implementations may be controlled by logic unit 1060 alone or in conjunction with API unit 1065. The input unit 1070 may be configured to obtain input for the calculations described in the example implementations, and the output unit 1075 may be configured to provide output based on the calculations described in example implementations.

Processor(s) 1010 can be configured to determine volume identification information such as metadata 110 indicated in FIG. 1 derived from a scan from the storage system or from user input, and a probabilistic data structure indicative of size of duplicate data in a volume as illustrated in storage descriptors 120 of FIG. 1, from sampling data stored in the volume through a hyperloglog process, a bloom filter, or other methods in accordance with the desired implementation; generate storage descriptor data describing the volume from the volume identification information and the probabilistic data structure as illustrated in SDDS 100 of FIG. 1 to incorporate the metadata 110 and the storage descriptors 120; storing the storage descriptor data in a centralized management system as illustrated in FIG. 2; and generating a user interface configured to indicate a state of data reduction of the volume, as illustrated in the example user interface panels of FIG. 4. Through such example implementations, storage systems can determine the underlying characteristics of the dataset stored in the storage volumes in terms of compressibility, without having to migrate the dataset and conduct the compression process on the data beforehand, thereby saving processing power while eliminating the need to transfer the dataset. As illustrated in FIG. 1 and as described herein, the volume identification information can involve information derived either directly from the volume itself or indirectly from information associated with the volume in accordance with the desired implementation. Further, the volume as described herein can be a subset of an individual volume, a plurality of volume subsets, or a dataset in memory depending on the desired implementation.

In example implementations, user interface can involve user interface panels as illustrated in FIG. 4, however, the present disclosure is not limited thereto. Other interface such as command-line interfaces, application programming interfaces, log interfaces, or any desired graphical user interface can also be utilized to facilitate the desired implementation.

Depending on the desired implementation, the storage system may be utilized as the centralized management system, or the centralized management system can be in the form of a dedicated management node.

As illustrated in FIG. 1, the storage descriptor data 120 can include an expected physical capacity 122 required for allocation in a storage array for conducting migration on the volume. Such information can be provided through a hyperloglog process or a bloom filter process. Through including such data, storage systems that are the target of migration for the volume can thereby automatically determine the amount of physical storage needed to be allocated to facilitate the volume migration.

In example implementations, processor(s) 1010 can be configured to receive a selection of a plurality of volumes managed by the centralized management system as illustrated at 301 and 302 of FIG. 3; and combine the storage descriptor data associated with the plurality of volumes to indicate the state of data reduction of the plurality of volumes as illustrated at 303 of FIG. 3. Such combination can involve combining one or more of hyperloglog information 123, number of zero pages 124, compression information such as the compression ratio as determined form local capacity 121 and expected physical capacity 122, or other probabilistic data structures from the storage descriptor data of each of the plurality of volumes. In another example implementation the combining of the storage descriptor data involves combining a data reduction rate 303 or 400 from the storage descriptor data of each of the plurality of volumes.

Depending on the desired implementation, the processor(s) 1010 are configured to execute the process of determining and transmitting the SDDS in response to a migration of the volume to a storage system. Further, as illustrated in FIG. 6, the centralized management system manages the storage descriptor data for a plurality of volumes and sub-aggregates the plurality of volumes based on the volume identification information in the storage descriptor data of each of the plurality of volumes.

In an example involving migration of a volume managed by the storage system, processor(s) 1010 can be configured to generate the SDDS as described above. Subsequently, based on the SDDS information, the processor(s) 1010 can execute a process to identify and eliminate the zero pages, and cancel out the duplicate data according to the storage descriptors 120. Accordingly, the storage system can request a target storage system of the corresponding physical capacity requirements from the expected physical capacity 122 of the storage descriptors 120, and then migrate the volume to the target storage system once the target storage system has allocated the appropriate storage.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
   determining volume identification information and a probabilistic data structure indicative of size of duplicate data in a volume from sampling data stored in the volume;
   generating storage descriptor data describing the volume from the volume identification information and the probabilistic data structure;
   storing the storage descriptor data in a centralized management system;
   generating a user interface configured to indicate a state of data reduction of the volume;
   receiving a selection of a plurality of volumes managed by the centralized management system; and
   combining the storage descriptor data associated with the plurality of volumes to indicate the state of data reduction of the plurality of volumes;
   wherein combining the storage descriptor data comprises combining one or more of hyperloglog information, compression information, and number of zero pages from the storage descriptor data of each of the plurality of volumes.

2. The method of claim 1, wherein the storage descriptor data comprises an expected physical capacity required for allocation in a storage array for conducting migration on the volume.

3. The method of claim 1, wherein combining the storage descriptor data comprises combining one or more of a probabilistic data structure and compression information from the storage descriptor data of each of the plurality of volumes.

4. A method, comprising:
   determining volume identification information and a probabilistic data structure indicative of size of duplicate data in a volume from sampling data stored in the volume;
   generating storage descriptor data describing the volume from the volume identification information and the probabilistic data structure;
   storing the storage descriptor data in a centralized management system;
   generating a user interface configured to indicate a state of data reduction of the volume;
   receiving a selection of a plurality of volumes managed by the centralized management system; and
   combining the storage descriptor data associated with the plurality of volumes to indicate the state of data reduction of the plurality of volumes;
   wherein combining the storage descriptor data comprises combining a data reduction rate from the storage descriptor data of each of the plurality of volumes.

5. The method of claim 1, wherein the method is executed in response to a migration of the volume to a storage system.

6. The method of claim 1, wherein the method is executed by a storage system managing the volume.

7. The method of claim 1, wherein the centralized management system manages the storage descriptor data for a plurality of volumes and sub-aggregates the plurality of volumes based on the volume identification information in the storage descriptor data of each of the plurality of volumes.

8. A non-transitory computer readable medium, storing instructions for executing a process, the instructions comprising:
   determining volume identification information and a probabilistic data structure indicative of size of duplicate data in a volume from sampling data stored in the volume;

generating storage descriptor data describing the volume from the volume identification information and the probabilistic data structure;

storing the storage descriptor data in a centralized management system;

generating a user interface configured to indicate a state of data reduction of the volume;

receiving a selection of a plurality of volumes managed by the centralized management system; and combining the storage descriptor data associated with the plurality of volumes to indicate the state of data reduction of the plurality of volumes;

wherein combining the storage descriptor data comprises combining one or more of hyperloglog information, compression information, and number of zero pages from the storage descriptor data of each of the plurality of volumes.

9. The non-transitory computer readable medium of claim 8, wherein the storage descriptor data comprises an expected physical capacity required for allocation in a storage array for conducting migration on the volume.

10. The non-transitory computer readable medium of claim 8, wherein combining the storage descriptor data comprises combining one or more of a probabilistic data structure and compression information from the storage descriptor data of each of the plurality of volumes.

11. A non-transitory computer readable medium, storing instructions for executing a process, the instructions comprising:

determining volume identification information and a probabilistic data structure indicative of size of duplicate data in a volume from sampling data stored in the volume;

generating storage descriptor data describing the volume from the volume identification information and the probabilistic data structure;

storing the storage descriptor data in a centralized management system;

generating a user interface configured to indicate a state of data reduction of the volume;

receiving a selection of a plurality of volumes managed by the centralized management system; and combining the storage descriptor data associated with the plurality of volumes to indicate the state of data reduction of the plurality of volumes;

wherein combining the storage descriptor data comprises combining a data reduction rate from the storage descriptor data of each of the plurality of volumes.

12. The non-transitory computer readable medium of claim 8, wherein instructions are executed in response to a migration of the volume to a storage system.

13. The non-transitory computer readable medium of claim 8, wherein the instructions are executed by a storage system managing the volume.

14. The non-transitory computer readable medium of claim 8, wherein the centralized management system manages the storage descriptor data for a plurality of volumes and sub-aggregates the plurality of volumes based on the volume identification information in the storage descriptor data of each of the plurality of volumes.

15. A storage system configured to manage a plurality of volumes, the storage system comprising:

a processor, configured to:

determine volume identification information and a probabilistic data structure indicative of size of duplicate data in a volume from the plurality of volumes from sampling data stored in the volume;

generate storage descriptor data describing the volume from the volume identification information and the probabilistic data structure;

store the storage descriptor data in a centralized management system;

generate a user interface configured to indicate a state of data reduction of the volume;

receive a selection of a plurality of volumes managed by the centralized management system; and combine the storage descriptor data associated with the plurality of volumes to indicate the state of data reduction of the plurality of volumes;

wherein the processor is configured to combine the storage descriptor data by combining one or more of hyperloglog information, compression information, and number of zero pages from the storage descriptor data of each of the plurality of volumes.

* * * * *